US006947175B1

(12) United States Patent
Caruthers

(10) Patent No.: US 6,947,175 B1
(45) Date of Patent: Sep. 20, 2005

(54) METHOD AND SYSTEM FOR ADJUSTING COLOR MIXING DUE TO SUBSTRATE CHARACTERISTICS

(75) Inventor: Edward B. Caruthers, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 886 days.

(21) Appl. No.: 09/629,907

(22) Filed: Jul. 31, 2000

(51) Int. Cl.[7] .......................... G06F 15/00; G03F 3/08
(52) U.S. Cl. ..................................... 358/1.9; 358/518
(58) Field of Search ....................... 358/518, 1.9, 1.18, 358/505, 504, 501, 509, 512, 513, 514; 382/167, 382/162

(56) References Cited

U.S. PATENT DOCUMENTS

| 4,967,379 | A | * | 10/1990 | Ott .............................. 382/112 |
| 5,557,393 | A | | 9/1996 | Goodman et al. ........... 355/326 |
| 5,650,863 | A | * | 7/1997 | Utagawa et al. ............ 358/475 |
| 5,713,062 | A | | 1/1998 | Goodman et al. ............ 399/49 |
| 5,897,239 | A | | 4/1999 | Caruthers, Jr. et al. ........ 399/54 |
| 5,899,605 | A | | 5/1999 | Caruthers, Jr. et al. ..... 399/223 |
| 5,915,076 | A | * | 6/1999 | Sugita .......................... 358/1.9 |
| 6,052,195 | A | | 4/2000 | Mestha et al. .............. 356/425 |
| 6,373,573 | B1 | * | 4/2002 | Jung et al. ................... 356/419 |
| 6,587,652 | B2 | * | 7/2003 | Metzler ......................... 399/45 |
| 6,654,101 | B2 | * | 11/2003 | Suzuki et al. ................. 355/53 |

* cited by examiner

*Primary Examiner*—Madeleine Nguyen
(74) *Attorney, Agent, or Firm*—Perman & Green, LLP

(57) ABSTRACT

A method for adjusting fractional amounts of primary colors to be combined to substantially match a user selected color and substrate characteristics in a device adapted to color printing on a substrate. The method corrects for both the color and the reflectivity of the substrate on which the user selected color is to be printed. The method adjusts the target mixed ink transmission spectrum to compensate for the substrate characteristics. The method also identifies cases in which the target mixed ink transmission spectrum may not be compensated due to the paper's color. The method may be used to control mixing of inks in a custom color module of a marking engine; or mixing of dry toner primaries in a dry xerographic engine; or mixing of printing inks in a stand-alone ink mixing station.

3 Claims, 3 Drawing Sheets

METHOD AND SYSTEM FOR ADJUSTING COLOR MIXING DUE TO SUBSTRATE CHARACTERISTICS

BACKGROUND OF THE INVENTION

1. Field of the Invention

The present invention relates to document processing machines and, more particularly, to document processing machines adapted to color printing.

2. Prior Art

Referring to FIG. 1, there is shown a perspective view of a document processed apparatus 5. The apparatus 5 could be any suitable type of document processing apparatus, such as a copier, a facsimile machine, a scanner, or a computer printer adaptable to color processing and printing on a printable substrate.

One specific application of color processing is customer selectable color printing, wherein a very specific color is required. Customer selectable colors are typically utilized to provide instant identification and authenticity to a document. As such, the customer is usually concerned that the color meets particular color specifications. For example, the red color associated with the XEROX™ digital stylized "X" is a customer selectable color having a particular shade, hue and color value. Likewise, the particular shade of orange associated with Syracuse University is a good example of a customer selectable color. A more specialized example of customer selectable color output can be found in the field of custom color, which specifically refers to registered proprietary colors, such as used, for example, in corporate logos, authorized letterhead and official seals. The yellow associated with KOKAK™ brand products, and the brown associated with HERSHEY™ brand products are good examples of exacting custom colors which may be required in a highlight color or spot color printing application. However, the various colors typically utilized for standard highlighting processes generally do not precisely match customer selectable colors. Moreover, customer selectable colors typically cannot be accurately generated via halftone process color methods because the production of solid image areas of a particular color using halftone image processing techniques typically yields non-uniformity of the color in the image area. Further, lines and text produced by halftone process color are very sensitive to mis-registration of the multiple color images such that blurring, color variances, and other image quality defects may result.

As a result of the deficiencies noted above, customer selectable color production in electrostatographic printing systems is typically carried out by providing a singular premixed developing material composition (e.g., ink) made up of a mixture of multiple color toner particles blended in preselected concentrations for producing the desired customer selectable color output. This method of mixing multiple color toners to produce a particular color developing material is analogous to processes used to produce customer selectable color paints and inks. In offset printing, for example, a customer selectable color output image is produced by printing a solid image pattern with a premixed customer selectable color printing ink as opposed to printing a plurality of halftone image patterns with various primary colors or compliments thereof. This concept has generally been extended to electrostatographic printing technology, as disclosed, for example, in commonly assigned U.S. Pat. No. 5,557,393, wherein an electrostatic latent image is developed by a dry powder developing material comprising two or more compatible toner compositions to produce a customer selectable color output.

Customer selectable color printing materials including paints, printing inks and developing materials can be manufactured by determining precise amounts of constituent basic color components making up a given customer selectable color material, providing precisely measured amounts of each constituent basic color component and thoroughly mixing these color components. This process is commonly facilitated by reference to a color guide or swatch book containing hundreds or even thousands of swatches illustrating different colors, wherein each color swatch is associated with a specific formulation of colorants. Probably the most popular of these color guides is published by Pantones®, Inc. of Moonachie, N.J. The Pantone® Color Formula Guide expresses colors using a certified matching system and provides the precise formulation necessary to produce a specific customer selectable color by physically intermixing predetermined concentrations of up to four colors from a set of up to 16 principal or basic colors.

There are many colors available using the Pantone® system or other color formula guides of this nature that cannot be produced via typical half tone process color methods. In the typical operational environment, an electrostatographic printing system may be used to print various customer selectable color documents. To that end, replaceable containers of premixed customer selectable color developing materials corresponding to each customer selectable color are provided for each print job. Replacement of the premixed customer selectable color or substitution of another premixed color between different print jobs necessitates operator intervention and print job halts, among other undesirable requirements. Also, since each customer selectable color is typically manufactured at an off-site location, supplies of each customer selectable color printing ink must be separately stored and inventoried for each customer selectable color print job.

In addition, it is known that properties of the printable substrate also affects the color of the print. Many paper substrates are slightly off-white in the direction of blue or green or yellow. Such paper tint can shift the print color away from the customer-selected color, even though the developed ink layer is maintained exactly at its specified value. It is further known that the reflectivity of the substrate also effects the print color. More reflective substrates may result in color with higher gloss, higher brightness and higher measured color saturation then might otherwise be desired.

SUMMARY OF THE INVENTION

In accordance with the one embodiment of the invention, a method for adjusting fractional amounts of primary colorants to be combined to substantially match a user selected color and substrate characteristics in a device adapted to color printing on a substrate. The method comprising the steps of determining a compensated target transmission spectrum, $T_{comp}(\lambda)$ of a printable ink layer; optimizing an uncompensated target transmission spectrum, $T_{un-comp}(\lambda)$ of a printable ink layer; and comparing $T_{un-comp}(\lambda)$ with $T_{comp}(\lambda)$ plus a predetermined delta and selecting fractional amounts of primary colors to be combined to substantially match the user selected color and the substrate characteristics.

In accordance with another embodiment, a method for determining optical characteristics of a substrate to be printed on and adjusting color components of a desired color to compensate for the optical characteristics. The method comprising the steps of determining optical characteristics of a desired color; determining optical characteristics of the substrate to be printed on; and comparing the optical characteristics of the desired color and the optical characteristics of the substrate to be printed on and adjusting the color components of the desired color to compensate for the optical characteristics of the substrate to be printed on.

In accordance with another embodiment, a color mixing system in an apparatus adapted to printing color documents. The system comprising a source of a plurality of primary colorants; at least one optical characteristic source; at least one user interface; and a controller connectable to the at least one optical characteristic source and the at least one user interface, wherein the controller controls mixing of a plurality of primary colors from the source of primary colorants in response to the at least one optical characteristic source and the at least one user interface.

In accordance with another embodiment, a program storage device readable by a machine, tangibly embodying a program of instructions executable by the machine to perform method steps for adjusting fractional amounts of primary colors to be combined to substantially match a user selected color and substrate characteristics in a device adapted to color printing on a substrate. The method comprising the steps of determining a compensated target transmission spectrum, $T_{comp}(\lambda)$ of a printable ink layer, further comprising the steps of determining a color reflection spectrum, $R_{tgt}(\lambda)$, determining a substrate reflection spectrum, $R_s(\lambda)$, determining an average front surface substrate reflection, $R_{fs}$, combining $R_{tgt}(\lambda)$, $R_s(\lambda)$, and $R_{fs}$ to produce the target transmission spectrum, $T_{comp}(\lambda)$; optimizing an uncompensated target transmission spectrum, $T_{un-comp}(\lambda)$ of a printable ink layer, further comprising the step of optimizing:

$$T_{un-comp}(\lambda) = \exp\left(-\sum_j PMA_j \cdot dj(\lambda)\right)$$

where:

exp=2.71828 . . .

$PMA_j$=the printed mass per unit area associated with the primary color j, $\alpha_j(\lambda)$=the color absorption spectrum associated with the primary color j, and comparing $T_{un-comp}(\lambda)$ with $T_{comp}(\lambda)$ plus a predetermined delta and selecting fractional amounts of primary colorants to be combined to substantially match the user selected color and the substrate characteristics.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
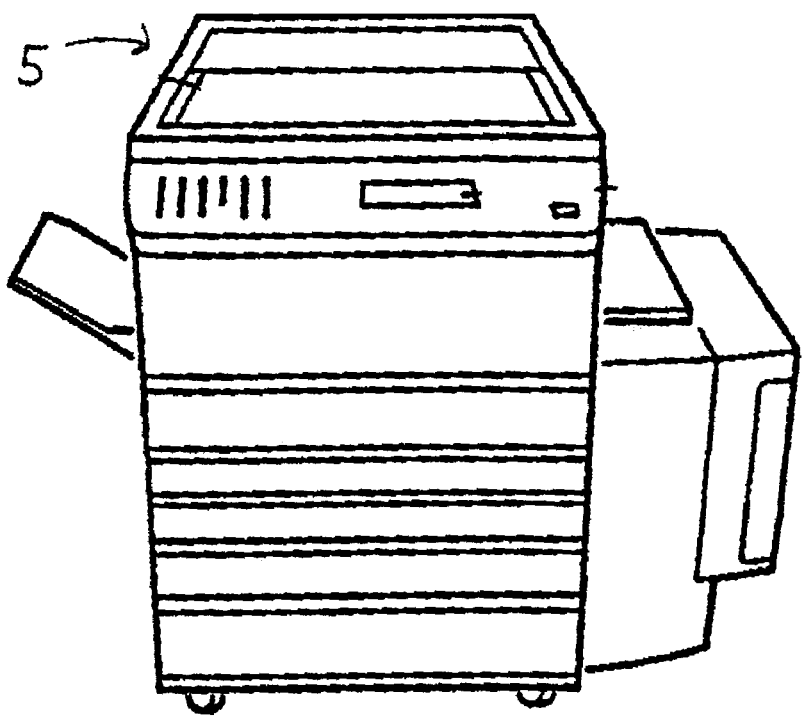
FIG. 1 is a perspective view of a conventional document processing apparatus adaptable to color printing.
Figure 2:
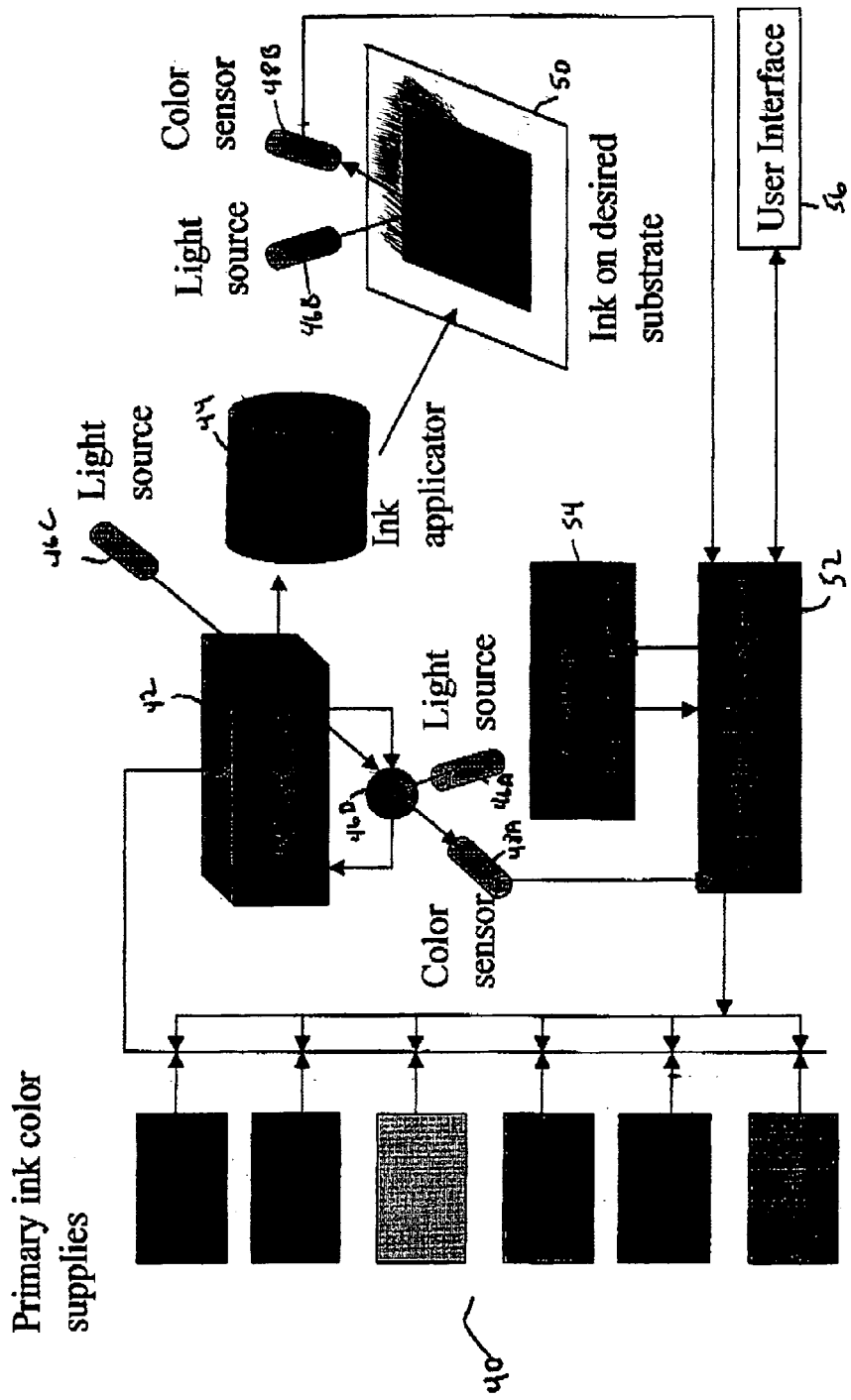
FIG. 2 is a schematic diagram of one embodiment of the invention.
Figure 3:
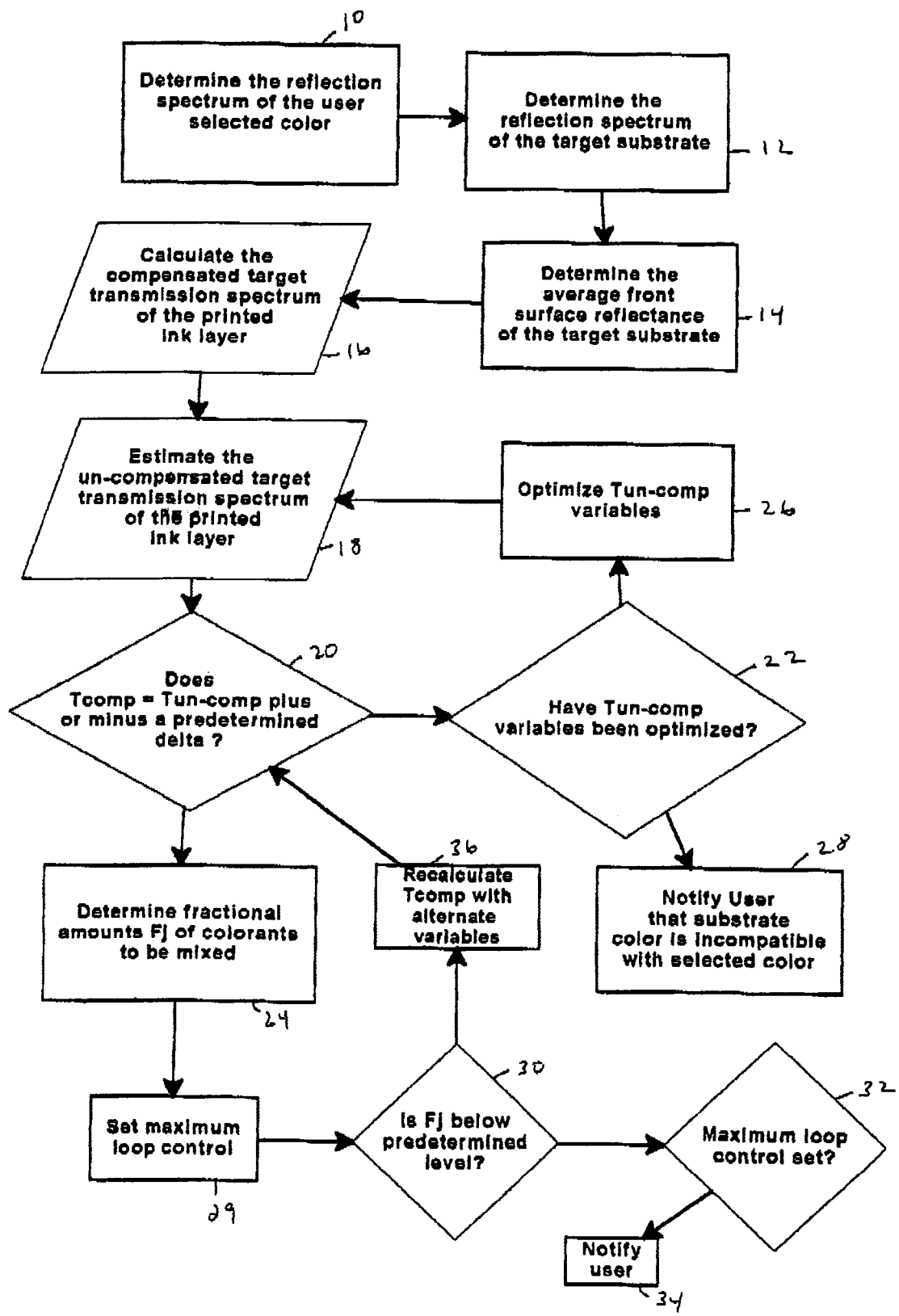
FIG. 3 is a method flow chart of one embodiment of the invention showing the steps for determining the fractions of colorants to be mixed.

Referring to FIGS. 2 and 3 there is shown a schematic and method flow chart of one embodiment of the invention. Although the present, invention will be described with reference to the single embodiment shown in the drawings, it should be understood that the present invention can be embodied in many alternate forms of embodiments.

The present invention contemplates a printing system wherein the fraction of color components of the colorant material to be mixed in a supply reservoir can be adjusted to account for paper substrate properties. In this manner, the color printed on the printable substrate will be in agreement with a predetermined customer selected color. Additionally, there may be more than one combination of fractional amounts of color components and substrate properties that meet the requirements of a customer selected color. By monitoring the mixed color materials, and selecting a different combination if a particular component is below a predetermined threshold, a wide range of customer selectable colors can be produced and maintained over very long print runs. Thus, the invention advantageously permits the user to mix user selected colorants on an as needed basis and to account for paper characteristics when printing a user specified color.

Referring now to FIG. 2, a light source 46B illuminates a paper substrate 50. The reflected light is converted to a signal by an optical sensor 48B and transmitted to control system 52. Control system 52 combines the converted optical data with information from the user interface 56 and ink characteristics from database 54 and determines the fractional amounts of ink from the primary ink supplies 40 to be mixed in reservoir 42 to compensate for the optical characteristics of the paper substrate 50. Alternatively, the optical characteristics of the paper substrate 50 may be stored as a table of the reflection spectrum $R_s(\lambda)$ and the average front surface reflectance $R_{fs}$ in database 54. The mixed ink from reservoir 42 is applied to ink applicator 44 and printed as required on to paper substrate 50. Alternatively, the ink characteristics and the relative proportions of the primary ink color supplies already mixed 42 may be estimated by measuring the transmission spectra of the light 46C transmitted through or light 46A reflected from a thin layer of the mixed colorant 46D by color sensor 48A. The proportions, e.g., the weight percents or the volume percents, of the constituent colorants of the mixed ink 42 are ascertained by Control System 52 and combined with the paper substrate characteristics from color sensor 48B. The required adjustment to the output color is then made by selectively adding additional amounts of the constituent colorant(s) from the primary ink supplies 40.

Referring also to FIG. 3, the invention determines 10 the reflection spectrum $R_{tgt}(\lambda)$ of the user selected color, determines 12 the reflection spectrum $R_s(\lambda)$ of the target substrate, and determines 14 the average front surface reflectance $R_{fs}$ of the target substrate. The invention calculates 16 the compensated target transmission spectrum of the printable ink layer using known relations between ink transmission, substrate reflectivity and perceived color:

$$T_{comp}(\lambda)=F[R_{fs}, R_s(\lambda), R_{tgt}(\lambda)] \quad (1)$$

Where $R_{fs}$ is the front surface reflectivity of the ink on the paper, $R_s$ is the reflection spectrum of the substrate, and $R_{tgt}$ is the reflection spectrum of the customer selected color. The relationship between theses quantities may be determined empirically or from color models. As an example of a specific, approximate relationship, the control system may assume that $$R(\lambda)=R_{fs}+(1-R_{fs})*T(\lambda)*R_s(\lambda)*T(\lambda) \tag{1a}$$

and the control system may calculate $$T_{comp}(\lambda)=SQRT[(R_{tgt}(\lambda)-R_{fs})/((1-R_{fs})*R_s(\lambda))] \tag{1b}$$

In one embodiment of the invention the next step estimates 18 a target transmission spectrum of the printable ink layer that is not compensated for the substrate properties. This estimate may come from a stored data base of target colors and the appropriate transmission spectra for inks printed on a standard substrate. Or this estimate may be calculated from empirically or theoretically determined relations between printed color masses per unit area, PMA, color absorption spectra, $\alpha(\lambda)$ and transmission spectra $$T_{un-comp}(\lambda)=F[PMA_j, \alpha(\lambda), j=1, N] \tag{2}$$

where j=1, N designates the set of individual colorants to be mixed to produce the customer selected color. As an example of a specific, approximate relationship, the control system may assume Bear's law and Lambert's law and determine $$T_{un-comp}(\lambda)=\exp(-\Sigma_j PMA_j*\alpha_j(\lambda)) \tag{2a}$$

The $PMA_j$ in equation 2a may come from a stored data base of colorant combinations known to produce different selectable colors, e.g., from the Pantone® system. Equation 2a is only exact when certain assumptions are satisfied, e.g., that light is not multiply scattered in passing through the ink layer. In other embodiments of the invention, empirical adjustments to equation 2a may be made, e.g., to correct for multiple scattering of light in the printed ink layer.

The next step compares 20 the results of equation (1) with the results of equation (2) to determine if $T_{comp}(\lambda)$ is within a predetermined range of $T_{un-comp}(\lambda)$.

If the comparison falls outside the predetermined range the next step determines 22 if the variables used in determining $T_{un-comp}(\lambda)$ have been optimized. If the variables have not been optimized a conventional multivariate optimization (e.g., least squares, Simplex, e.t.c.) may be used to optimize 26 the $PMA_j$ or other parameters until $T_{un-comp}(\lambda)$ is sufficiently close to $T_{comp}(\lambda)$. Otherwise the user may be notified 28 that the selected color is incompatible with the target substrate color.

If the comparison of $T_{un-comp}(\lambda)$ is sufficiently close to $T_{comp}(\lambda)$ then the fraction and color $F_j$ of each primary colorant j to be mixed is determined 24 according to the equation $$F_j=PMA_j/PMA_{tot} \tag{3}$$

where $$PMA_{tot}=\Sigma_j PMA_j \tag{4}$$

Step 30 determines if the fractional amount $F_j$ is below a predetermined reservoir level for that $j_{th}$ color and selecting an alternative combination of $\alpha_j$ and recalculates 36 equation (1) and re-compares 20 the results of equation (1) with the results of equation (2) to determine if $T_{comp}(\lambda)$ is within a predetermined delta of $T_{un-comp}(\lambda)$.

Steps 29 and 32 are used to control the number of times alternative solutions to $T_{comp}(\lambda)$ are determined. If loop control maximum has been set 29 and so determined 32 then the user is notified 34.

It should be understood that the foregoing description is only illustrative of the invention. Various alternatives and modifications can be devised by those skilled in the art without departing from the invention. For example, present invention relates document processing machines adapted to color printing such as, for example, ink jet printers, and is not restricted to xerographic machines. Accordingly, the present invention is intended to embrace all such alternatives, modifications and variances which fall within the scope of the appended claims.

What is claimed is:

1. A method for determining optical characteristics of a substrate to be printed on and adjusting color components of a desired color to compensate for said optical characteristics, the method comprising:

determining optical characteristics of a desired color including a target transmission spectrum of a printable ink layer of the desired color;

determining optical characteristics of the substrate to be printed on;

comparing the optical characteristics of the desired color and the optical characteristics of the substrate to be printed on;

adjusting the color components of the desired color by selecting fractional amounts of primary colors according to printed color masses per unit area relations of the primary colors; and combining the selected fractional amounts of primary colors into the desired color to compensate for said optical characteristics of the substrate to be printed on.

2. A method as in claim 1 wherein determining the optical characteristics for the desired color further comprises determining the reflection spectrum of the desired color.

3. A method as in claim 1 wherein determining optical characteristics of the substrate to be printed on further comprises:

determining the reflection spectrum of the substrate to be printed on; and determining the average front surface reflection of the substrate to be printed on.

* * * * *